United States Patent [19]
Wentworth, Jr.

[11] Patent Number: 5,255,514
[45] Date of Patent: Oct. 26, 1993

[54] APPARATUS AND METHOD FOR IMPROVING THE PERFORMANCE OF A TURBOCHARGER-EQUIPPED ENGINE

[76] Inventor: Fred A. Wentworth, Jr., R.F.D. 4, 100 Brentwood Rd., Exeter, N.H. 03833

[21] Appl. No.: 916,538

[22] Filed: Jul. 20, 1992

[51] Int. Cl.⁵ .............................................. F02B 33/44
[52] U.S. Cl. .................................. 60/605.1; 123/537; 123/25 P; 123/539
[58] Field of Search ...................... 60/605.1; 123/559.1, 123/536, 537, 539, 25 P

[56] References Cited

U.S. PATENT DOCUMENTS

| | | | |
|---|---|---|---|
| 2,294,313 | 8/1942 | Mock | 123/559.1 |
| 4,182,294 | 1/1980 | Emmenthal | 123/559.1 |
| 4,355,969 | 10/1982 | Nelson et al. | 123/536 |

Primary Examiner—Richard A. Bertsch
Assistant Examiner—Charles G. Freay
Attorney, Agent, or Firm—Hayes, Soloway, Hennessey & Hage

[57] ABSTRACT

Apparatus and method for improving the performance of an engine having a turbocharger are provided by flowing ion vapors to a region of negligible air pressure adjacent the compressor wheel of the turbocharger.

17 Claims, 3 Drawing Sheets

APPARATUS AND METHOD FOR IMPROVING THE PERFORMANCE OF A TURBOCHARGER-EQUIPPED ENGINE

BACKGROUND OF THE INVENTION

1. Field of the Invention

The present invention relates generally to an apparatus and method for enhancing the performance of fossil fuel combustion systems through the use of ion vapors, and more specifically to such an apparatus and method for use in a turbocharger-equipped internal combustion engine.

2. Brief Description of the Prior Art

The presence of measurable amounts of water vapor is known to have the catalytic effect of improving the efficiency of various combustion processes, as is described in Van Nostrand's Scientific Encyclopedia, 4th Edition FE, page 1501. For many years, and particularly in the last 20 years, bubbling and other types of vapor generators have been used effectively to improve the performance of internal combustion engines. Examples of vapor generators usable to enhance fossil fuel combustion efficiency are shown in applicant's U.S. Pat. Nos. 3,862,189, 4,016,837, 4,410,467, and 4,952,340. Additionally, a research report of the inventor's prior ion vapor technology is given in Nelson, K.L. et al, "Augmentation of Gas-Phase Combustion By Bubbling Combustion Air Through Air," Proceedings of Alternate Energy Sources IV; Hydrocarbon Technology Environment (Ann Arbor, Mich. Vol. 6 1982, pp. 273–289. In all of the arrangements described in these publications, the exact mechanisms by which ion vapor enhances combustion efficiency has never been fully understood, nor is it understood now. Combustion is an extremely complex chemical process.

The use of ion vapor, however, has been shown to not be quite as effective in improving the performance of turbocharger equipped engines as when used in conventional engines. The exact technical and scientific reasons for this are not entirely understood. It is thought, however, that the major factors contributing toward the noticeably reduced effects of ion vapors on the performance of turbocharger-equipped engines are pressure gradients and turbulence created in the air stream by the turbocharger's air compressor wheel. For reasons not entirely understood, these effects seem to interfere with the catalytic effects that ordinarily accompany the vapors. This problem is not appreciated in the prior art and no method or apparatus has been provided therein to alleviate this problem.

OBJECTS OF THE INVENTION

It is therefore an object of the present invention to provide an apparatus and method for improving, by using the combustion-improving catalytic effects of ion vapors, the performance of a turbocharger-equipped engine. A more specific object of the present invention is to provide such an apparatus and method wherein the vapors are supplied to a turbocharger-equipped engine in such a way that the combustion-improving catalytic effects of the ion vapors are not significantly reduced.

SUMMARY OF THE INVENTION

Accordingly, the present invention provides an apparatus and method for improving the efficiency of a turbocharger-equipped engine. An apparatus according to the instant invention comprises at least one conduit means capable of delivering ion vapors, produced by a conventional ion vapor producing or generating means, to a region of negligible air pressure adjacent the turbocharger's compressor wheel. The conduit means contemplated by the instant invention may comprise nozzle means for further directing the flow of ion vapors from the conduit means to the negligible pressure region preferred embodiment of the instant invention, the conduit means also includes means for controlling the flow of the ion vapors therethrough, and may also include pumping means for forceably pumping ion vapors through the conduit means uniformly under pressure, to the region of negligible air pressure adjacent the compressor wheel. Also, in another, and particularly advantageous embodiment, the ion vapors are directed by the conduit means to a central portion of the compressor wheel. In this embodiment, the wheel may have at its center at least one hole with a size and shape that is adapted to permit passage of the ion vapors therethrough with minimal interference from the rotation of the compressor wheel.

Advantageously, the instant invention permits ion vapors to be supplied to a turbocharger-equipped engine in such a way that the combustion-improving effects of the ion vapors are not degraded during their passage through the turbocharger's compressor wheel. Thus, according to the instant invention, the powerful catalytic effects of ion vapors may be used to enhance the performance of turbocharger-equipped engines, and particularly of turbocharger-equipped diesel engines.

For further understanding of the present invention, reference should be had to the following Detailed Description taken in conjunction with the accompanying drawings wherein like numerals depict like parts, and in which:

While the present invention will hereinafter be described in connection with preferred embodiments and methods of use, it will be understood by those skilled in the art that it is not intended to limit the invention to these embodiments. On the contrary, it is intended to cover all such alternative, modifications, and equivalents as may be included within the spirit and broad scope of the invention as defined only by the appended claims.

DESCRIPTION OF THE PREFERRED EMBODIMENTS

Figure 1:
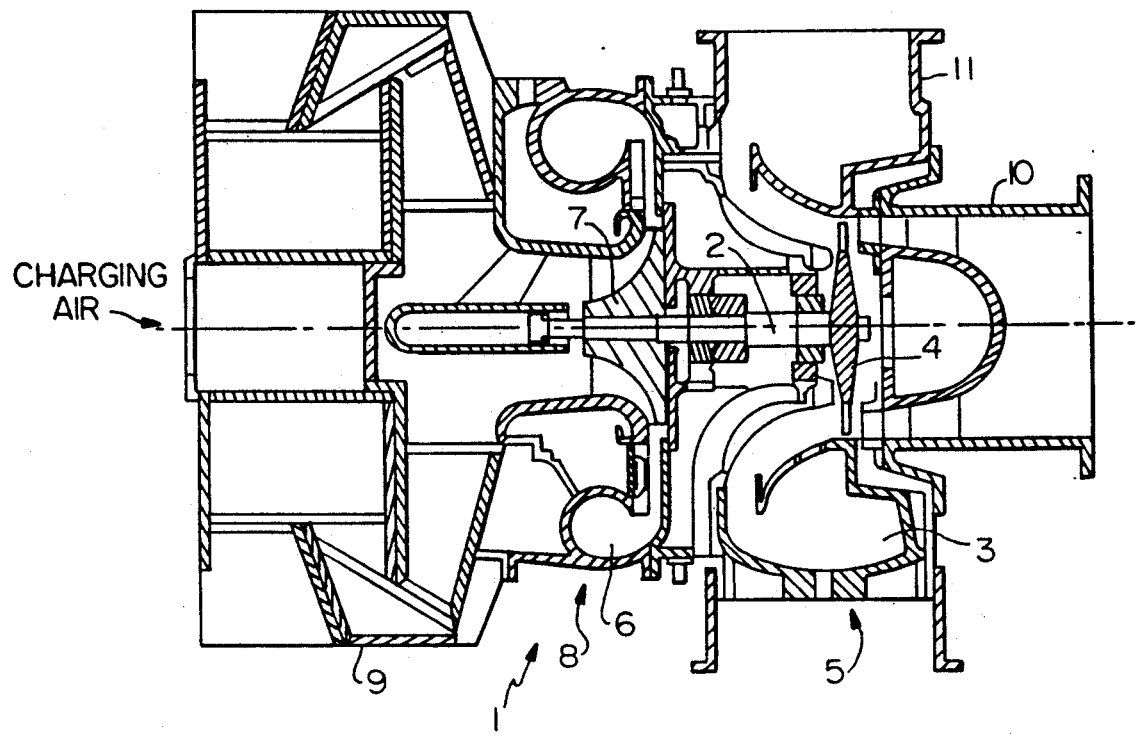
FIG. 1 is a cross-sectional view of a typical turbocharger system.

Referring first to FIG. 1 which, schematically, shows the overall arrangement of a turbocharging system for an internal combustion engine (not shown), which may be, for example, a conventional Otto cycle internal combustion engine, or a diesel engine.

A typical turbocharging system includes a turbocharger 1 which is located on a shaft 2, common to a turbine wheel 4, and operating within a turbine housing 3. The turbine wheel 4 forms part of an exhaust gas turbine 5. A compression housing 6 retains therein a compressor wheel 7, forming part of a charged air compressor 8. An air filter 9 with a noise damper is usually placed in front of the compressor 8 at the inlet thereof. The outlet of the compressor housing 6 is coupled to a charged air manifold which, in turn, is coupled to the inlet or induction air ducts of the internal combustion engine. The inlet stub 10 of the exhaust gas turbine 5 is coupled to an exhaust manifold of the internal combustion engine. The exhaust gases from the exhaust turbine 5 are emitted from the stub 11. Thus, by equipping an engine with a turbocharger it is possible to provide additional charging air to the engine under specific operating conditions in order to enhance the amount of energy released from fuel combustion. Combustion energy yield may also be increased by applying charged ion vapors to the compressed air stream. Unfortunately, however, it has not been possible until the present invention to apply charged ion vapors to the compressed air stream of a turbocharger without diminishing the catalytic effect of the vapors.

Figure 4:
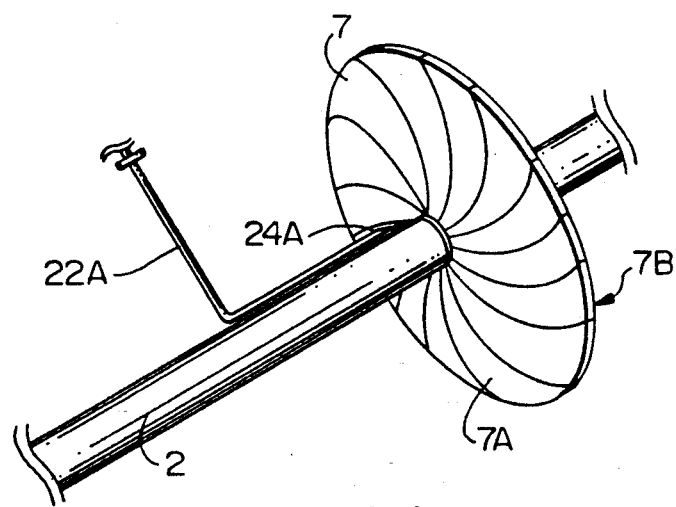
FIG. 4 is a perspective cross-sectional of the embodiment depicted in FIG. 3.
Figure 2:
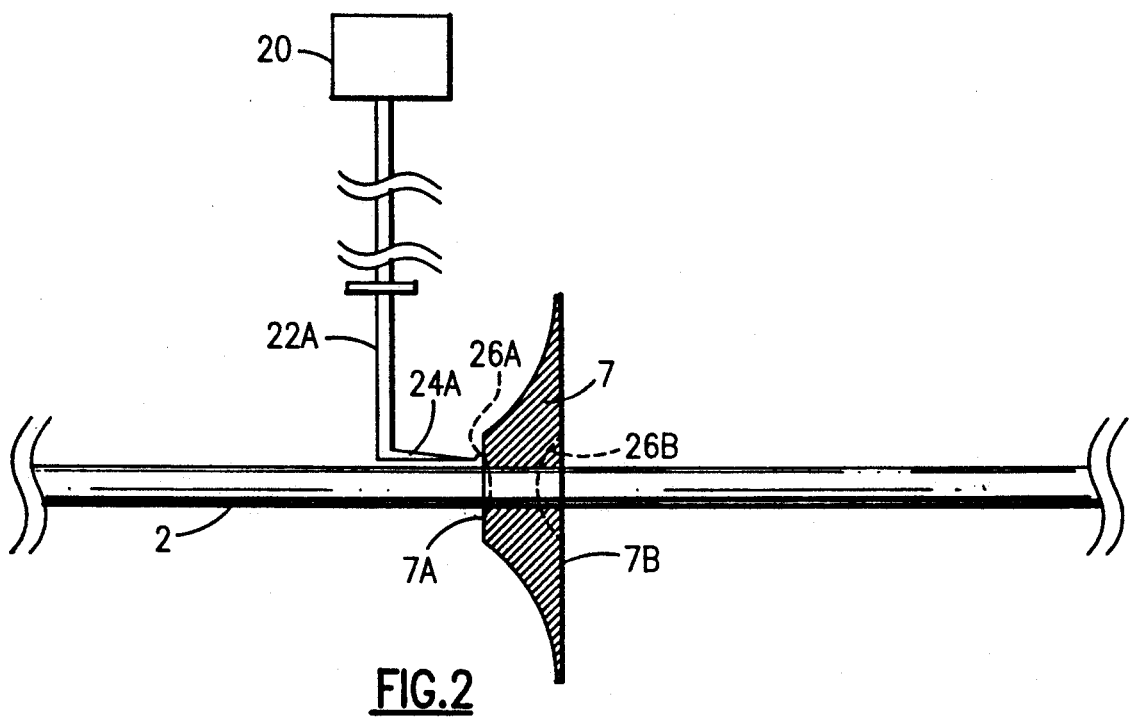
FIG. 2 is a side cross-sectional view of one embodiment of an apparatus made according to the instant invention.
Figure 3:
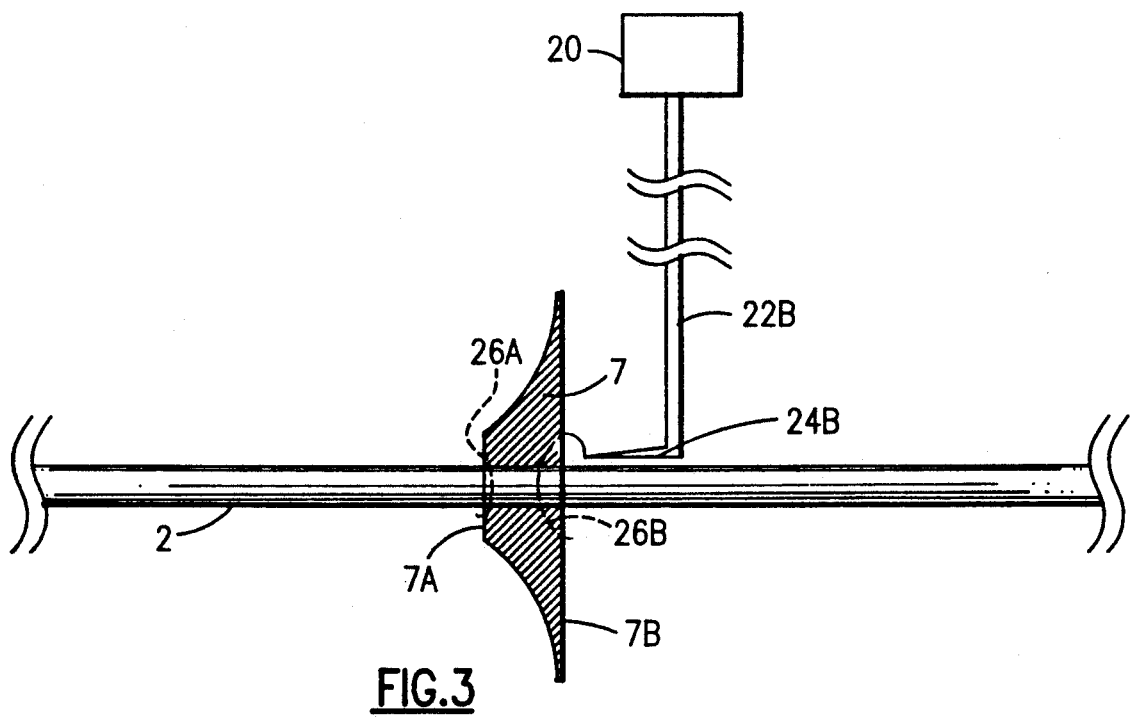
FIG. 3 is a side cross-sectional view of another embodiment of an apparatus made according to the instant invention.

Referring now to FIGS. 2-4, the present invention simply and efficiently makes possible the application of charged ion vapor to the compressed air stream of a turbocharger without eliminating the desirable combustion-improving effects of the vapors. This is accomplished by providing a conduit means 22A, 22B, which is capable of directing the ion vapors produced by ion vapor producing means 20, which may be any type of conventional ion vapor generator adapted for use in an internal combustion engine, to a region of negligible air pressure 26A, 26B nearby the compressor wheel 7. Preferably, the conduit means 22A, 22B takes the form of a stainless steel or plastic or ceramic elongate conduit or tube of small diameter and adapted for use in the confined spaces surrounding the compressor wheel 7. However, as will be understood by those skilled in the art, other materials, shapes and configurations of the conduit means are possible so long as such modified materials, shapes and/or configurations do not inhibit the free rotation of the wheel 7 or interfere with the compression of air by the turbocharger, and so long as the conduit means is capable of directing the ion vapors to a region of negligible air pressure adjacent the wheel 7. Usually, and preferably, regions of negligible air pressure are at, or near, central portions (adjacent the shaft 2) of the wheel 7 as shown in dashed lines 26A, 26B on the upstream 7A and downstream 7B sides of the wheel 7. These regions of negligible air pressure 26A, 26B are formed when the wheel 7 rotates with the shaft 2. As is known in the art, the compression force exerted on the air stream by the rotating wheel increases proportionally according to the distance from the center of the wheel toward the wheel's periphery. In other words, air nearest the center of the wheel (that is nearest the shaft 2) will have the least force applied to it, and therefore, the least (and, usually, negligible) air pressure will be found there also. It has been found, according the instant invention, that by supplying ion vapor to areas of negligible pressure, the catalytic effect of the vapor is not lost and may be used advantageously in the combustion process Therefore, in light of the foregoing discussion, and as is shown in FIGS. 2-4, the conduit means 22A, 22B is positioned to supply the ion vapors to either the upstream 7A or downstream 7B side of the wheel 7. Preferably, the conduit means also comprises nozzle means 24A, 24B for further directing the flow of ion vapors from the conduit means 22A, 22B to the region of negligible pressure 26A, 26B, respectively. Also, it should be understood, that although this compressor wheel configuration produces regions of negligible pressure at or adjacent a central portion of the wheel (that is nearby the shaft), other wheel configurations may produce these regions in other areas, and therefore, the conduit means may be modified so as to direct the ion vapors wherever the regions of negligible pressure may be found, without departing from the instant invention.

Figure 5:
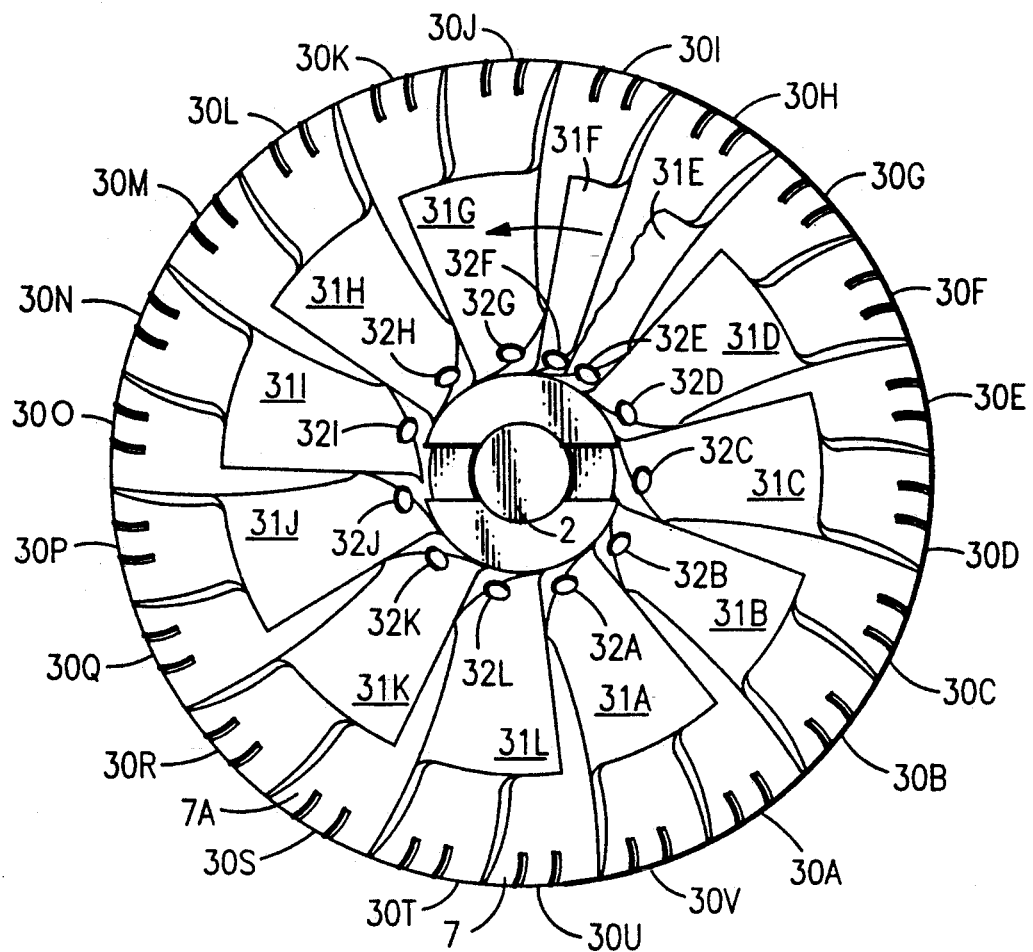
FIG. 5 is front view of a compressor wheel adapted for use according to one aspect of the instant invention.

Turning now to FIG. 5, there is shown a further aspect of the instant invention in which the compression wheel 7 is modified so as to permit the ion vapors supplied by the conduit means to be passed through the wheel 7. Advantageously, this wheel configuration permits the ion vapors to be passed through the wheel with minimal interference from pressure differentials and/or turbulence in the compressed air stream. This modification comprises forming at least one, and preferably, a plurality of holes 32A ... 32L in each of the individual veins 31A ... 31L making up the blades 30A ... 30V of the wheel 7. Preferably, both the size and shape of the holes 32A ... 32L are adapted, to permit the ion vapors to be transferred from the upstream 7A side of the wheel 7 to the downstream 7B side with minimal turbulence and/or pressure interference. It should be understood, of course, that the number of holes corresponding to the number of veins may be adapted as needed according to both the shape and general mechanical configuration of the wheel 7 without departing from the instant invention. Also, as will be understood by those skilled in the art, the charged ion vapors themselves may be negatively charged, and are preferably hydroxyl ion vapors, but other ion vapors may be used in the instant invention so long as the vapors produce a combustion improving catalytic effect. In use, therefore, the ion vapor generating means 20 produces ion vapors of the desired type that is, (the type having a noticeable combustion-improving catalytic effect) and these ion vapors are directed through the conduit means 22A, 22B. The ion vapors are then flowed through, preferably, nozzle means 24A, 24B to a region of negligible pressure nearby the compressor wheel 7. In the embodiment shown in FIG. 2, the nozzle means 24A directs the ion vapors to the region 26A on the upstream 7A of the compressor wheel 7, while in the embodiment shown in FIG. 3, the nozzle means 24B directs the ion vapors to region 26B of negligible pressure on the downstream 7B side of the compressor wheel 7. In either embodiment, and in accordance with the instant invention, the ion vapors thus directed to the region of negligible pressure are then forced by the compression action of the compressor wheel into the engine (not shown) to enhance engine efficiency. According to the instant invention, the charged ion vapors are transmitted to the engine along with the charged air without undergoing catalytic performance degradation, as in the prior art.

As will be appreciated by one skilled in the art, the present invention provides a number of advantages over the prior art. The instant invention permits charged ion vapors, and their attendant combustion-improving catalytic effects, to be used in turbocharged-equipped engines. This is not possible according to the prior art. As has been detailed in the foregoing disclosure, ion vapors supplied to an engine, according to the instant invention, not subject to catalytic performance degradation as in the prior art.

Figure 6:
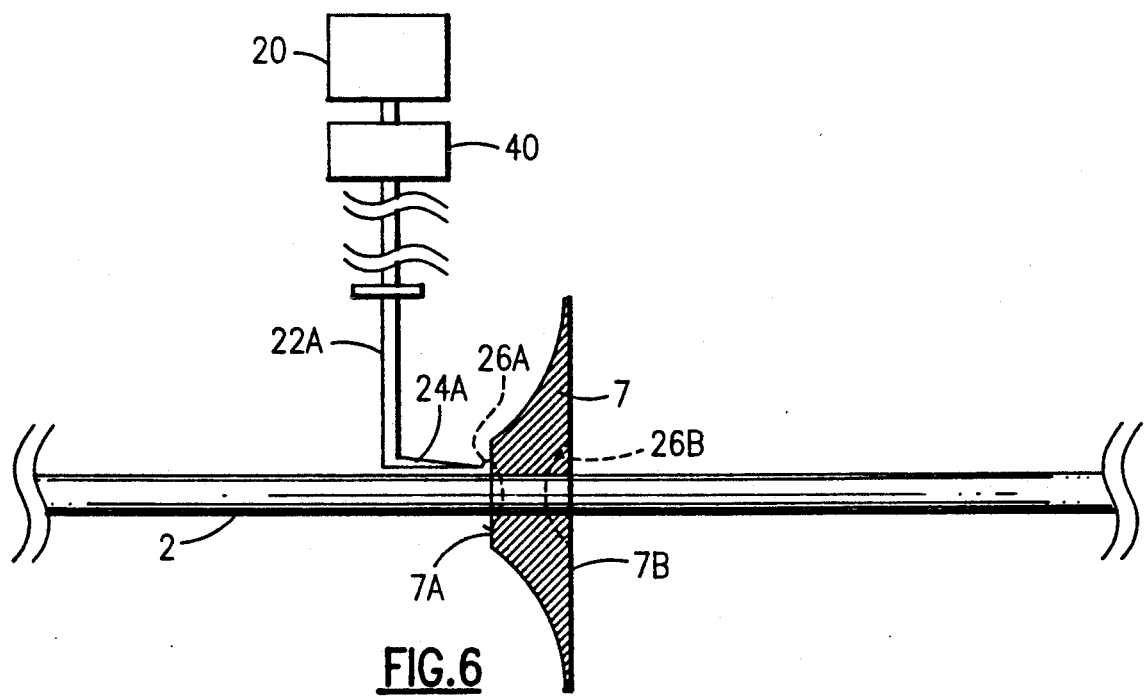
FIG. 6 is a side-cross sectional view of a modification of the embodiment shown in FIG. 2, which modification includes means for forceably pumping ion vapors.

It is, therefore, evident that there has been provided, in accordance with the present invention a method and apparatus for improving the performance of an engine having a turbocharger, that fully satisfies both the aims and objectives hereinbefore set forth. While this invention has been described in conjunction with specific embodiments thereof, it will be evident to those skilled in the art that many alternative, modifications, and variations will be possible. For example, the conduit means according to the instant invention may also include forced pumping means for pumping the ion vapors supplied by the generating means through the conduit means 40 under substantially uniform pressure, shown in FIG. 6. Also, a plurality of conduit means may be used to flow ion vapors from the producing means to regions of negligible pressure adjacent the wheel without departing from the instant invention. Thus, the instant invention is intended to embrace all of these and other alternatives modifications, and variations, as fall within the spirit and broad scope of the hereinafter appended claims.

What is claimed is:

1. In apparatus for improving the performance of an engine having a turbocharger including a compressor wheel by supplying ion vapors to said engine from ion vapor producing means, the improvement comprising at least one conduit means capable of directing said ion vapors from said producing means to a region of negligible air pressure adjacent said compressor wheel.

2. In apparatus according to claim 1, the improvement wherein said region is on the downstream side of said compressor wheel.

3. In apparatus according to claim 1, the improvement wherein said region is on the upstream side of said compressor wheel.

4. In apparatus according to claim 1, the improvement which comprises nozzle means for further directing the flow of said ion vapors from said conduit means to said region of negligible air pressure.

5. In apparatus according to claim 1, the improvement wherein said engine is a diesel engine.

6. In apparatus according to claim 1, the improvement wherein said engine comprises an Otto cycle internal combustion engine.

7. In apparatus according to claim 1, the improvement wherein said region is at a central portion of said compressor wheel.

8. In apparatus according to claim 7, the improvement wherein said central portion of said wheel has at least one hole for permitting passage of said ion vapors from one side of said compressor wheel to the other.

9. In apparatus according to claim 1, the improvement wherein said producing means is capable of producing negatively charged ion vapors.

10. In apparatus according to claim 9 the improvement wherein said producing means is capable of producing hydroxyl ion vapors.

11. In apparatus according to claim 1, the improvement wherein said conduit means includes pumping means for pumping said ion vapors through said conduit means at a substantially uniform pressure.

12. In apparatus according to claim 11, the improvement wherein said pumping means includes an air pump.

13. In a method for improving the performance of an engine having a turbocharger including a compressor wheel, the improvement which comprises supplying ion vapors from a producing means through at least one conduit means to a region of negligible air pressure adjacent said compressor wheel.

14. In a method according to claim 13, the improvement wherein said ion vapors are supplied to a region on the downstream side of said compressor wheel.

15. In a method according to claim 13, the improvement wherein said ion vapors are supplied to a region on the upstream side of said compressor wheel.

16. In a method according to claim 13, the improvement wherein the ion vapors supplied produced by said producing means are negatively charged.

17. In a method according to claim 13, the improvement wherein the ion vapors supplied are hydroxyl ion vapors.

* * * * *